United States Patent
Wang

(10) Patent No.: US 6,947,806 B2
(45) Date of Patent: Sep. 20, 2005

(54) SYSTEM AND METHOD FOR EFFECTIVE YIELD LOSS ANALYSIS FOR SEMICONDUCTOR WAFERS

(75) Inventor: Wun Wang, Taipei (TW)

(73) Assignee: ProMOS Technologies Inc., Hsinchu (TW)

( * ) Notice: Subject to any disclaimer, the term of this patent is extended or adjusted under 35 U.S.C. 154(b) by 8 days.

(21) Appl. No.: 10/655,850

(22) Filed: Sep. 4, 2003

(65) Prior Publication Data

US 2005/0055121 A1 Mar. 10, 2005

(51) Int. Cl.[7] .............................................. G06F 19/00
(52) U.S. Cl. ...................... 700/121; 700/110; 702/84
(58) Field of Search ................................. 700/109, 110, 700/121, 120; 702/82–84

(56) References Cited

U.S. PATENT DOCUMENTS 6,367,040 B1 * 4/2002 Ott et al. .................... 714/724
6,496,958 B1 * 12/2002 Ott et al. ........................ 716/4
6,613,590 B2 * 9/2003 Simmons ...................... 438/14
6,717,431 B2 * 4/2004 Rathei et al. ................ 324/765
2002/0002415 A1 * 1/2002 Mugibayashi et al. ...... 700/110

OTHER PUBLICATIONS

Patterson, O.D., Hansen, M.H., "The impact of tolerance on kill ratio estimation for memory", Advanced Semiconductor Manufacturing Conference and Workshop, 2000 IEEE/SEMI, Sep. 12–14, 2000, pp.: 175–180.*

* cited by examiner

Primary Examiner—Leo Picard
Assistant Examiner—Zoila Cabrera
(74) Attorney, Agent, or Firm—J. C. Patents

(57) ABSTRACT

This invention relates to a method for yield loss analysis of process steps of semiconductor wafers having a plurality of dies, and more particularly relates to a defect inspection technique to determine a hit ratio, computation of yield impact contributions for the defects, and determination of a kill ratio for a specific type of defect. Yield loss is estimated ultimately upon a choice of a defect density distribution function. A defect calibrated factor and a yield impact calibrated factor are introduced herein.

10 Claims, 6 Drawing Sheets

| Table A. $f(D_0)$ Reference Table | | | |
|---|---|---|---|
| Condition (defect distribution probability function) | Author / Issued Year | Yield Model ($Y_{die}$) | Yield Loss Model : $Y_{loss} = f(D_0)$ |
| $P(D) = D_0$ | Hofstein and Heiman / 1963 | $Y_{die} = e^{-D_0 A}$ | $Y_{loss} = (1 - e^{-D_0 A}) \cong D_0 A$ |
| $P(D) = D / D_0^2$ for $0 \le D \le D_0$ $2 / D_0 - D / D_0^2$ for $0 \le D \le 2D_0$ | Murphy / 1964 | $Y_{die} = [(1 - e^{-D_0 A}) / D_0 A]^2$ | $Y_{loss} = 1 - [(1 - e^{-D_0 A}) / D_0 A]^2$ |
| $P(D) = e^{-D/D_0} / D_0$ | Seeds / 1967 | $Y_{die} = 1 / (1 + D_0 A)$ | $Y_{loss} = 1 - [1 / (1 + D_0 A)]$ |

FIG. 6

| average defect density per die | Seeds model (Yield loss) | Poisson model (Yield loss) |
|---|---|---|
| 0.1 | 1.00 | 1 |
| 0.2 | 1.83 | 2 |
| 0.3 | 2.54 | 3 |
| 0.4 | 3.14 | 4 |
| 0.5 | 3.67 | 5 |
| 0.6 | 4.13 | 6 |
| 0.7 | 4.53 | 7 |
| 0.8 | 4.89 | 8 |
| 0.9 | 5.21 | 9 |
| 1 | 5.50 | 10 |
| 1.1 | 5.76 | 11 |
| 1.2 | 6.00 | 12 |
| 1.3 | 6.22 | 13 |
| 1.4 | 6.42 | 14 |
| 1.5 | 6.60 | 15 |
| 1.6 | 6.77 | 16 |
| 1.7 | 6.93 | 17 |
| 1.8 | 7.07 | 18 |
| 1.9 | 7.21 | 19 |
| 2 | 7.33 | 20 |

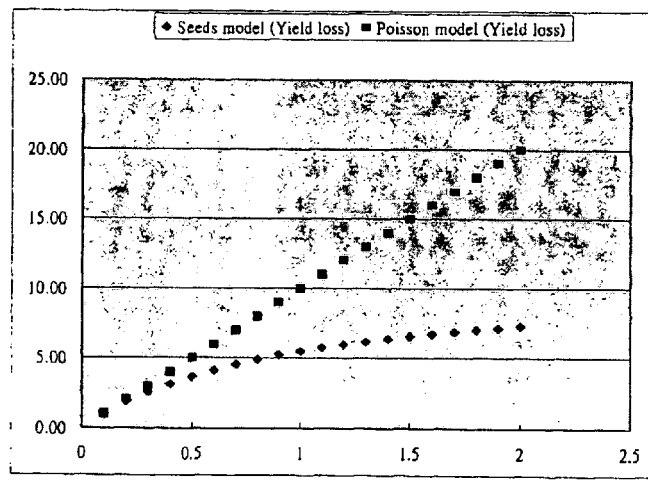

FIG. 7

SYSTEM AND METHOD FOR EFFECTIVE YIELD LOSS ANALYSIS FOR SEMICONDUCTOR WAFERS

BACKGROUND OF THE INVENTION

1. Field of Invention

This present invention relates to a defect inspection and classification of semiconductor wafers having a plurality of dies. And more particularly, the present invention relates to a method for calculating yield impact contributed by specific defect type in order to predict yield loss effectively.

2. Description of Related Art

Defect monitor methodology typically involves defect inspection and classification of defect types through optical microscope and Scanning Electron Microscope (SEM) review in order to control particles and defects that are inexpectant in production. In order to shorten the respond time and implement appropriate improvements for integrated circuits manufacturers, it is fairly important to establish an estimation scheme of various types of defects on the yield issue. This estimation scheme also allows an engineer to prioritize the defect reduction plan in the fabrication process. The first literature for yield estimation was reported by Wallmark in 1960. Since then, extensive work has been done concerning the different defect density distribution and probability function. However, the methodology for computing the effect of defects on yield was not well developed.

Defect counts are usually used to track excursions and set priorities for defect reduction efforts, but the total defect counts information on its own or even including further characterizations for each single defect by optical microscopes or SEM is not sufficient to control excursion. Moreover, it is neither sufficient to assign an accurate number of yield loss according to the existing yield prediction models to each process for complex chip designs. The review of all inspected defects may as well delay the manufacturing process of semiconductor chips and yield learning cycles significantly.

The concept of "kill ratio" is introduced to estimate the effect of defects on yield loss contributed by specific defect type. It can be defined as the upper limit for yield estimation that could be obtained if the defect type was the only factor affecting the yield. An available prior methodology provides a method following the steps:

(a) The step of computing kill ratio for a given process inspection includes dividing hits on failed dies by defect counts for the process inspection may be included.

(b) The step of determining a number of dies to be killed by considering kill ratio for the dies with hits to weight the defects of each die. It may include the steps of determining a number of dies to be killed by considering all dies with hits, initializing the number of dies to be killed to zero, and modifying the number of dies to be killed. This modification can be done by calculating a kill ratio between a kill ratio for each process inspection having hits and a sum of the kill rates for all process inspections having hits and adding the ratio to a previous number of dies to be killed. The previous number of dies to be killed is being obtained at a previously considered die and repeating the step of modifying until all dies have been considered.

(c) The step of the foregoing modification is preferably performed using the formula:

$$k_i = k_{i,previous} + m \cdot \frac{r_i}{\sum_{i=1}^{n} r_i}$$

where $k_i$ is a newly calculated number of dies to be killed for inspection process i, $k_{i,previous}$ is the previously calculated number of dies to be killed for the defects of inspection process i, $r_i$ is the kill rate for a given inspection process i, n is the number of processes which provided hits to the dies to be killed and m is the defect counts of a give type for a die being considered for the inspection process i.

(d) The step of determining a yield loss for each inspection process based on the number of dies to be killed and a total number of dies may include calculating the yield loss by dividing the number of dies to be killed of a given inspection process by the total number of dies of the semiconductor wafer. The method may further include the step of determining a killing probability yield loss for each inspection process based on the number of dies to be killed for each inspection process and a total number of defects for the inspection process.

Unfortunately, practitioners in the semiconductor industry still hazily utilize the kill ratio concept. To obtain useful yield impact information, it is desirable to establish a succinct "kill ratio" definition in order to filter out excursions in a control table, and show an effective expression for yield loss contribution for specific defect type.

SUMMARY OF THE INVENTION

It is an object of the present invention to provide a calibrated method to calculate kill ratio upon inspected real defect counts of a semiconductor wafer having a plurality of dies.

It is an object of the present invention to provide a calibrated method to calculate kill ratio upon sampled defect counts of semiconductor wafer having a plurality of dies.

It is an object of the present invention to provide a method to predict yield loss with respect to yield impact upon selected defect density function according to defect classification on certain layer of a semiconductor wafer having a plurality of dies.

As embodied and broadly described herein, the invention provides a method to accomplish above objects, including the following steps:

(a) The step of computing kill ratio for a given process inspection includes dividing a number of hits on failed dies by a number of defects of wafer for the process inspected.

(b) The step of determining a number of yield impact contribution by considering defect counts of a specific defects for all die with hits to weight the hit ratio of each defect, includes the steps of initializing the yield impact contribution of specific defect to zero, and modifying the yield impact contribution number. This modification can be done by calculating a hit ratio weighted by defect counts of specific defect for each die inspection having hits and a sum of the weighted hit ratio for all defect inspections having hits and adding the ratio to a previous yield impact contribution. The previous yield impact is being obtained at a previously considered die and repeating the step of modifying until all dies have been considered.

(c) The step of modifying is preferably performed using a formula:

$$Kc_{ij} = Kc_{ij-1} + \frac{hr_i \cdot n_{ij}}{\sum_k (hr_k \cdot n_{kj})} \cdot \varphi_i \qquad \text{EQ. 1}$$

where $Kc_i$: the yield impact contributions of a specific defect i j: die index (from 1 to N)

k: defect index $hr_k$: hit ratio of a specific defect k $n_{kj}$: the specific defect k count of die j $\phi_j$: die impact factor of die j;

The yield impact is then calibrated with the formula:

$$Kc_i = Kc_{ij} \cdot \alpha \qquad \text{EQ. 2}$$

where α is a defect contribution calibrated factor (d) Furthermore, to establish a more effective yield model, defect inspection following "die-based sampling" is introduced in order to expedite kill ratio estimation. In replacement with foregoing $Kc_i$, the step is preferably performed using a formula following foregoing naming convention:

$$Kc_i = K'c_i \cdot \alpha \qquad \text{EQ. 3}$$

$$K'c_i = \frac{hr_i \cdot \omega_i}{\sum_k (hr_k \cdot \omega_k)} \cdot n_f \qquad \text{EQ. 4}$$

where k: defect code $n_f$: fail die count with defect $hr_k$: hit ratio of specific defect k $\omega_k$: the percentage of specific defect k of defect review sampling (e) The step of calculating kill ratio upon yield impact factor Kci is preferably performed using the formula:

$$Kr_{i0} = \frac{Kc_i}{(ND_{i0}A)\beta_i} \qquad \text{EQ. 5}$$

where $Kr_{i0}$: the average kill ratio that a specific defect i kills a die $D_{i0}$: average defect density of specific defect i A: die area $\beta_i$: average defect density of specific defect i vs. yield impact contribution calibrated factor (f) Lastly the step of yield loss prediction is preferably performed using the formula:

$$Y_i = Kr_{i0} \cdot [(D_{i0}A)\beta_i] \qquad \text{EQ. 6}$$

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIGS. 3 and 2b form a flow/block diagram showing a method for determining yield loss upon die-based-sampling defect counts in accordance with one preferred embodiment of this invention.

FIG. 6 is a table of choices of defect density functions for yield loss calculation in one preferred embodiment of this invention.

FIG. 7 is a table of data and a chart showing yield loss upon various yield models in accordance with one preferred embodiment of this invention.

DESCRIPTION OF THE PREFERRED EMBODIMENTS

This disclosure relates to a yield loss analysis method of semiconductor wafers having a plurality of dies, and more particularly to a method for estimation of yield impact contributed by specific defect in order to predict yield loss. The present invention provides a method for "kill ratio" calculation according to defect counts for each defect type and die of a wafer. The present invention also provides a method for effective "kill ratio" calculation with the participation of defect contribution calibrated factor upon "die-based-sampling" technique. Lastly, the present invention provides a method determining yield loss upon selected defect density distribution model. The yield loss analysis method is described as follows.

Figure 1:
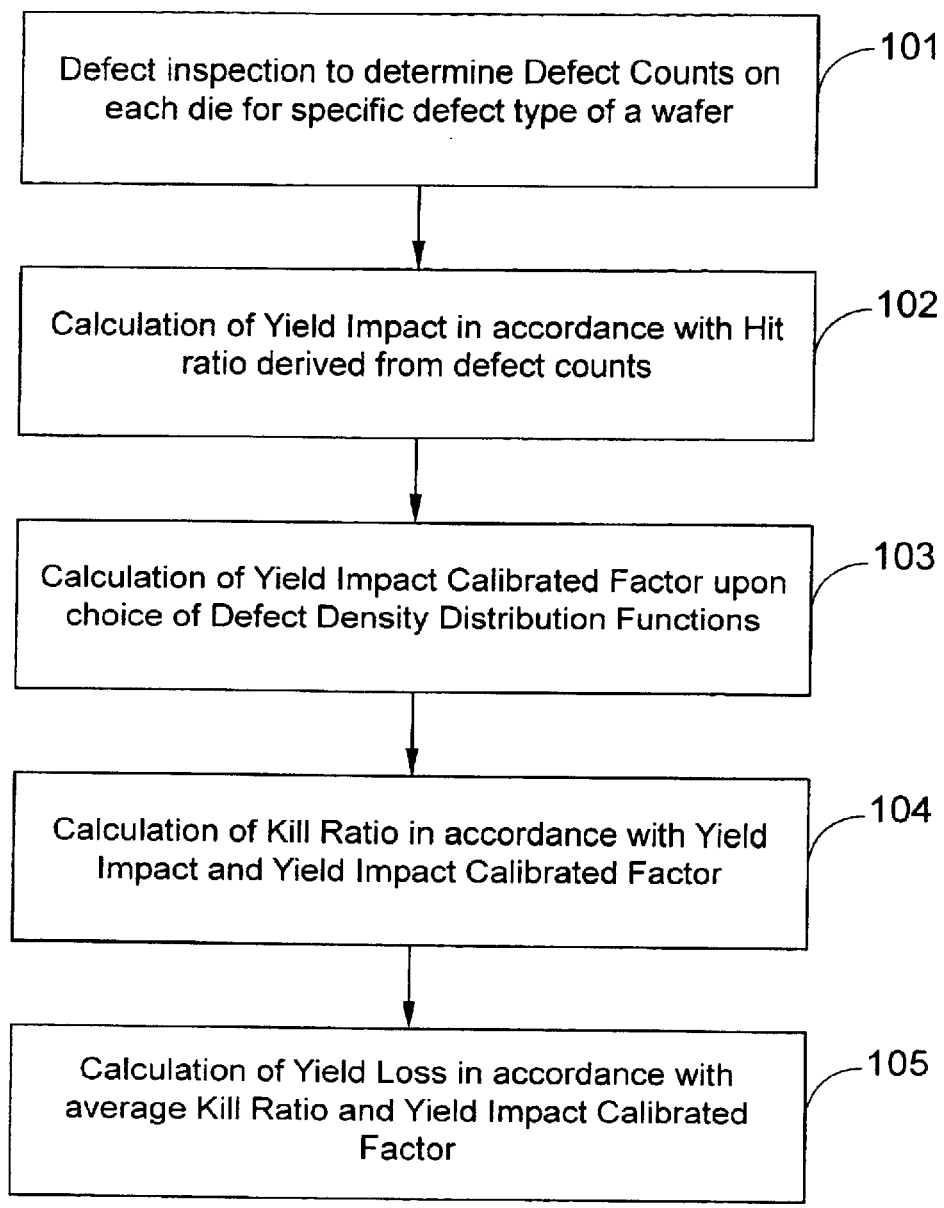
FIG. 1 is a flow/block diagram showing a method for determining yield loss in accordance with one preferred embodiment of this invention.

Referring now in specific detail to the drawings in which like reference numerals identify similar or identical elements throughout the several views. Initially referring to FIG. 1, a flow/block diagram 100 is shown. In block 101, defects are reviewed by automated optical microscope or manual scanning electron microscope (SEM) to determine defect counts for specific types of defects of dies of a wafer. The inspection can be extended to classification of defects of dies, or of layers of wafers in different lots of semiconductor processes. In block 102, hit ratio of each inspected defect type is calculated by the method of dividing an impacted die counts by the defect counts of a specific defect type of a wafer. Yield impact of the specific defect type is also calculated with the weighted hit ratio divided by the sum of weighted hit ratio of each defect type, with the participation of an impact calibrated factor. In block 103, a yield impact calibrated factor is calculated upon choice of defect density distribution functions provided in the table in FIG. 6. In block 104, kill ratio for the specific defect type is obtained by the calculation of dividing the yield impact by a product of average defect density of the specific defect and the specific defect counts. Lastly, in block 105 the yield loss of the inspected wafers having a plurality of dies is obtained therein by multiplication of average kill ratio, defect counts and yield impact contribution calibrated factor.

Figure 2A:
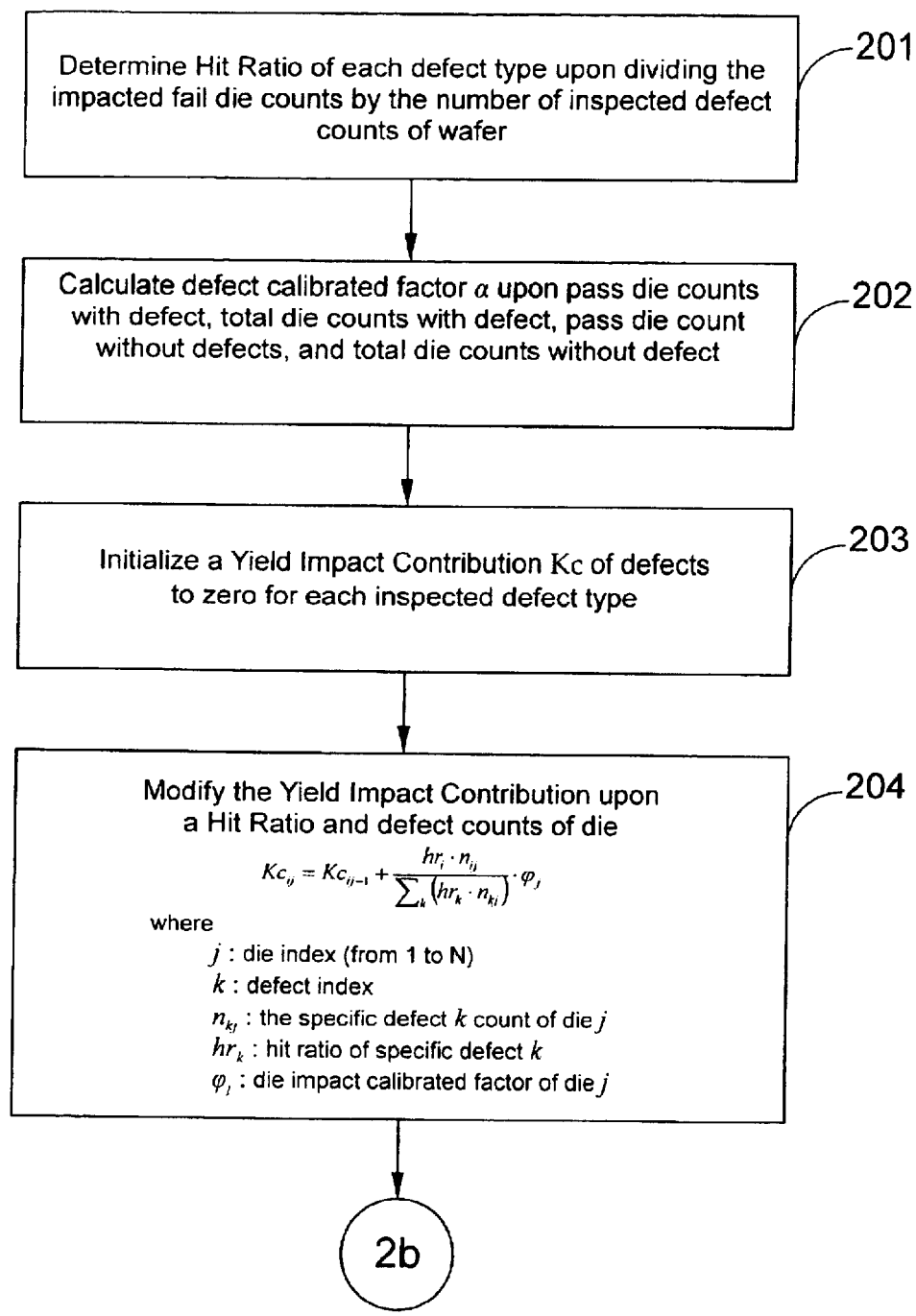
FIGS. 2a–2b form a flow/block diagram showing a method for determining yield loss upon real defect counts in accordance with one preferred embodiment of this invention.
Figure 2B:
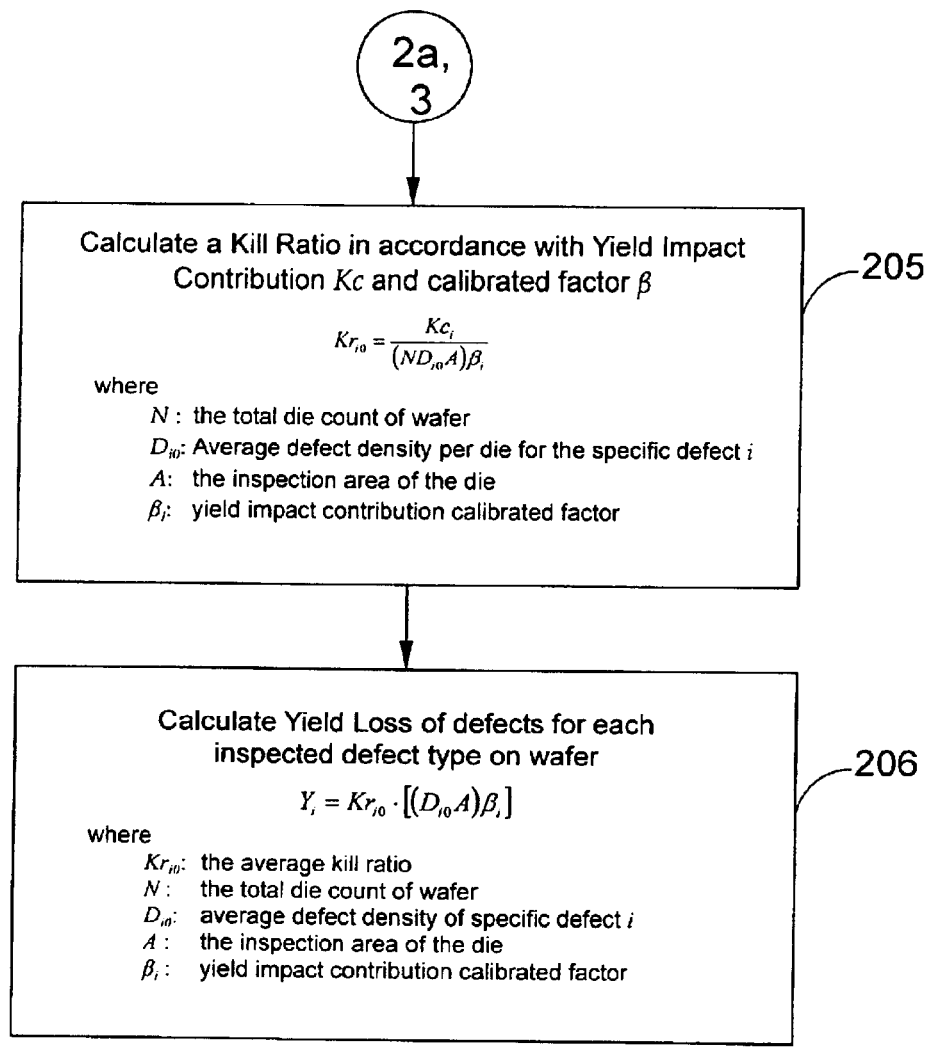
Figure 4:
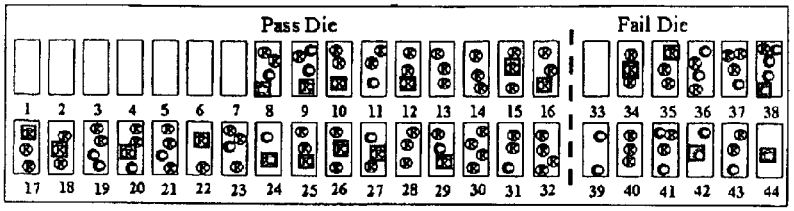
FIG. 4 illustrates a set of 44 dies having two types of defects followed by real classification analysis for inspected defects on a wafer in accordance with one preferred embodiment of this invention.

Referring to FIG. 2a–b, a flow/block diagram is shown. A method for yield loss analysis in accordance with real defect classification is described therein. The preferred embodiment of this method in FIG. 4 is simultaneously demonstrated. In block 201, the hit ratio of a specific defect type is determined upon dividing the impacted fail die counts by the inspected defects counts of wafer. Real defect counts of inspected defect types are used therein. Referring to FIG. 4, providing a wafer having a plurality of 44 dies, two types of defect are inspected therein. The defect count of type ® is 85, and the defect count of type © is 30. Among 10 failed dies, 8 dies of each type are found hit and failed for both types of defect. Thus the hit rate for the present types of defect is obtained: $hr_® = 8/85 = 0.094$, $hr_© = 8/30 = 0.267$. In block 202, in order to eliminate the excursion of defect counts between a plurality of defect types and dies, a defect contribution calibrated factor is introduced therein. Considering pass/fail events, and with/without defect dies, the defect contribution calibrated factor is defined by a plurality of parameters herein:

$$\alpha = \left[1 - \frac{a/b}{c/d}\right] \cdot \frac{b}{b-a}$$

where
   a=pass die count with defect
   b=total die count with defect
   c=pass die count without defect
   d=total die count without defect In this present embodiment, $\alpha$ is calculated: $\alpha = \{1 - [(25/36)/(7/8)]\} \cdot [36/(36-25)] = 0.675$. Notice that if $\alpha < 0$, the effect of defect is minute, thus can be neglected compared with other parameters of variation. The participation of $\alpha$ mainly estimates the impact of dies with defects instead of using die counts in this present invention.

In block 203, the yield impact contribution is calculated for each inspected defect type. Utilize the foregoing weighted hit ratio method, formulae EQ. 1–2 demonstrate the calculations:

$$Kc_{ij} = Kc_{ij-1} + \frac{hr_i \cdot n_{ij}}{\sum_k (hr_k \cdot n_{kj})} \cdot \varphi_j \quad \text{EQ. 1}$$

$$Kc_i = Kc_{ij} \cdot \alpha \quad \text{EQ. 2}$$

where $Kc_i$ is the yield impact contribution of a specific defect i, j is die index, k is defect index, $\alpha$ is defect contribution calibrated factor, $hr_k$ is hit ratio of a specific defect k, $n_{kj}$ is the specific defect k count of die j, and $\phi_j$ is die impact factor of die j. Notice that $\phi_j = 0$ when die j is pass die, $\phi_j = 1$ when die j is fail die. In EQ. 1, $Kc_{i0}$ is preset to zero, i.e. $Kc_{®,0} = 0$, $Kc_{©,0} = 0$. Now referring to block 204. Considering die impact factor $\phi_j$, die 1 to die 32 are all pass die, thus $Kc_{®,j} = 0$ and $Kc_{©,j} = 0$ for j=1 to 32. For defect type ®, $Kc_®$ starts to accumulate value from die 34, calculated as $Kc_{®,34} = 0 + 1 = 1$. From die 35 on, defect count $n_{®j}$ starts to play its weighted role to hit ratio and the sum of hit ratio over a plurality of dies, thus the values of $Kc_{®,j}$ for j=35 to 44 are obtained as shown in FIG. 4 sequentially. The values of $Kc_{©,j}$ for j=33 to 44 are obtained under same manner as shown in FIG. 4 in detail. Notice that $Kc_{®,44} = 4.528$, and $Kc_{©,44} = 4.528 = 6.472$ in this preferred embodiment. Consequently, the yield impact for specific type of defect is performed using EQ. 2 with participation of the defect calibrated factor $\alpha$ after all inspected dies are scanned and impact for previous dies are all calculated: $Kc_® = 4.528 \cdot 0.675 = 3.056$, $Kc_© = 6.472 \cdot 0.675 = 4.369$ in this preferred embodiment shown in FIG. 4.

In block 205, kill ratio of specific defect of a plurality of dies is calculated. It follows the formula:

$$Kr_{i0} = \frac{Kc_i}{(ND_{i0}A)\beta_i} \quad \text{EQ. 5}$$

where $Kr_{i0}$ is the average kill ratio that a specific defect i kills a die, $D_{i0}$ is average defect density of specific defect i, A is inspected die area, and $\beta_i$ is yield impact contribution calibrated factor. Notice that $\beta_i$ is obtained by $\beta_i = f(D_{i0})/D_{i0}A$, where $f(D_{i0})$ is defect density distribution function varying with defect type and density. The choices of density distribution function are listed in the table in FIG. 6. In this preferred embodiment, $f(D_{i0})$ is chosen to be Poisson model, provided by Hofstein and Heiman as shown in FIG. 6. Kill ratio of types of defect is obtained: $Kr_® = 3.056/85 = 0.036$, and $Kr_© = 4.369/30 = 0.146$.

Lastly referring to block 206, yield loss of each inspected defect type $Y_i$ is calculated upon average kill ratio and yield impact contribution calibrated factor using the formula in EQ. 6:

$$Y_i = Kr_{i0} \cdot [(D_{i0}A)\beta_i] \quad \text{EQ. 6}$$

Figure 3:
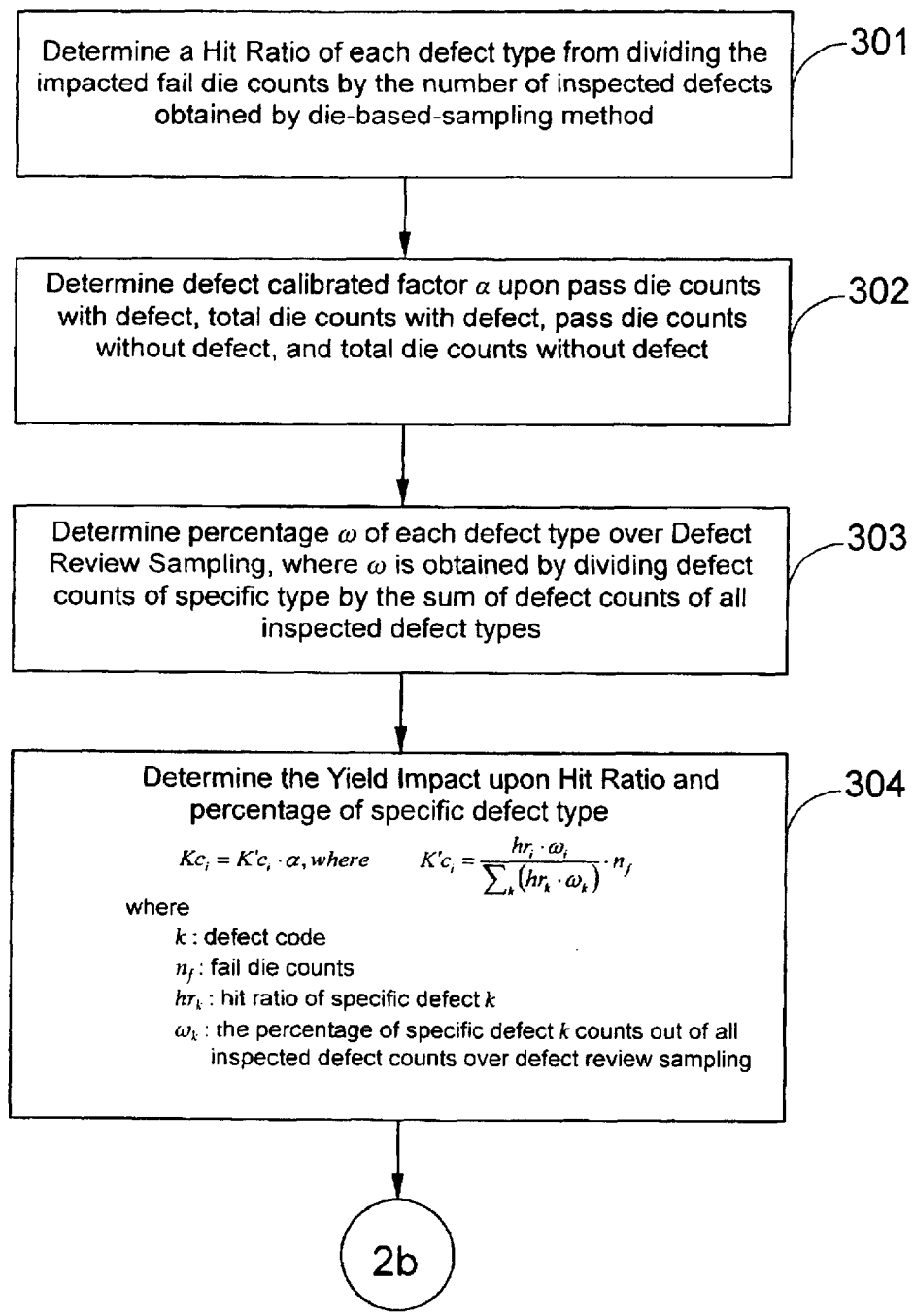
Figure 5:
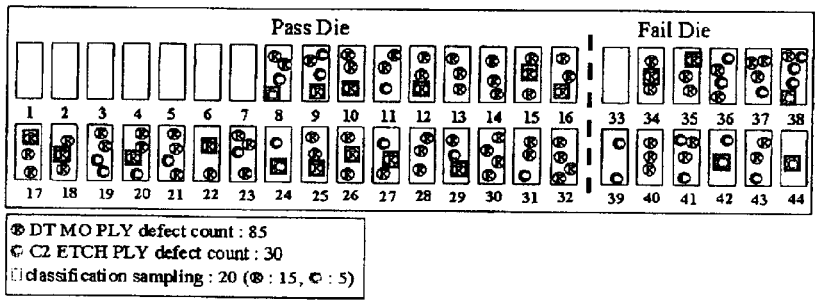
FIG. 5 illustrates a set of 44 dies having two types of defects followed by sampling classification analysis for inspected effects on a wafer in accordance with one preferred embodiment of this invention.

Referring to FIG. 3, a flow/block diagram describing an effective method of yield loss estimation is shown. A method of yield loss analysis in accordance with sampled fail die counts is described therein. The preferred embodiment of this method is simultaneously demonstrated in FIG. 5. In block 301, the hit ratio of specific defect is calculated using the formula $h_k = \rho_k/c_k$, where $\rho_k$ is the impacted fail die counts of wafer by the specific defect k upon defect review sampling, and $c_k$ is the specific defect k counts upon defect review sampling. Thus referring to FIG. 5, on the wafer map of this preferred embodiment, those defects that are framed with squares are indicated as those are sampled in this review sampling method. Hit ratio $hr_® = 2/5 = 0.133$, and $hr_© = 3/5 = 0.6$ are calculated therein. Notice that determining hit ratio of each defect type follows the same manner as foregoing embodiment, yet the real impacted fail die counts is replaced with the fail die counts reviewed by a sampling method.

In block 302, the defect contribution calibrated factor $\alpha$ is calculated by the same manner in foregoing embodiment. Thus $\alpha$ possesses the same value as foregoing preferred embodiment upon real defect counts, where $\alpha = 0.675$. Referring to block 303, a percentage of defect counts $\omega$ of a specific defect k over all inspected defects counts is determined. Thus in this preferred embodiment in FIG. 5, 15 of type ® defect are found by sampling, and 5 of type © defect are found as well. Thus $\omega_® = 15/20 = 0.75$, and $\omega_© = 5/20 = 0.25$ are obtained as shown.

Referring to block 304, the yield impact of this preferred embodiment is calculated using the formulae:

$$Kc_i = K'c_i \cdot \alpha \quad \text{EQ. 3}$$

$$K'c_i = \frac{hr_i \cdot \omega_i}{\sum_k (hr_k \cdot \omega_k)} \cdot n_f \quad \text{EQ. 4}$$

where k is defect code, $n_f$ is fail die count, $hr_k$ is hit ratio of specific defect k, and $\omega_k$ is the percentage of specific defect k counts out of all inspected defect counts over defect review sampling. Notice that this calculation of yield impact is calibrated with the α factor in the same manner as in the foregoing preferred embodiment, and the weighted hit ratio method in the foregoing preferred embodiment is simplified by weighting with percentage factor ω. The method of sequential calculation through all dies is replaced with a single step for each type of defect. Thus in FIG. 5, Kc= [(0.133*0.75)/(0.133*0.75+0.6*0.25)]*11*0.675=2.97, and Kc©=[(0.60*0.25)/(0.133*0.75+0.6*0.25)]*11*0.675= 4.455 are obtained therein. Notice that this "die-based-sampling" technique is introduced to expedite the calculation of yield impact Kc, wherein the concept of weighted hit ratio is performed as the percentage of specific defect out of defect review sampling.

The remaining kill ratio calculation and yield loss estimation steps are identical to foregoing preferred embodiment, thus the steps in FIG. 3 are followed by the steps in FIG. 2b thereof, i.e. blocks 205 and 206 concatenate to block 304 thereafter. The values of kill ratio and yield loss are obtained therein: $Kr_®=2.97/85=0.035$, $Kr_©=4.455/30=0.149$. Notice that the variations between the values of kill ratio herein and those in foregoing preferred embodiments using real defect counts are under 2%, which are appropriate for estimation. To compare the yield loss calculated upon various Seeds and Poisson yield models, a chart is shown in FIG. 7 in accordance with this present invention.

Having described preferred embodiments for a method for correlating defect counts data to determining kill ratio and yield impact for semiconductor devices, it is noted that modifications and variations can be made by persons skilled in the art in light of above teachings. It is therefore to be understood that changes maybe made in the particular embodiments of the invention disclosed which are within the scope and sprit of the invention as outlined by the appended claims. Having thus described the invention with the details and particularity required by the patent laws, what is claimed and desired protected by Letters Patent is set forth in the appended claims.

What is claimed is:

1. A method for determining yield loss of process steps for semiconductor wafers having a plurality of dies, the method comprising:

inspecting the dies of the semiconductor wafers to determine a defect type and a defect count for each the defect type;

electrical testing the dies of the semiconductor wafers to determine a fail die and a pass die, wherein each of the fail die having single defector or a plurality of defects is indicated as a hit;

determining a defect calibrated factor for eliminating defect count excursions in a yield control table for the semiconductor wafers, wherein the defect calibrated factor is based on a difference between a ratio of the hits to a quantity of the dies with defects and a ratio of a quantity of the fail dies without defects to a quantity of the pass dies without defects;

weighting a hit ratio with a function of the defect counts of the defect type, wherein the hit ratio is ratio of the hits of the defect type to the defect counts of the defect type;

determining a yield impact contribution for each of the defect types, wherein the yield impact contribution is based on a calibrated ratio of the weighted hit ratio for each of the defect types to a sum of the weighted hit ratio for all of the defect types;

determining a kill ratio for each of the defect types, wherein the kill ratio is based on a yield impact calibrated factor for the defect types, a total quantity of the defect counts, an average defect density of the defect types, and a die area; and determining a yield loss for each of the defect types, wherein the yield loss is based on the kill ratio for the defect type, the average defect density of the defect type, the die area, and the yield impact calibrated factor.

2. The method as recited in claim 1, wherein the step of determining the defect calibrated factor is computed using a normalizing formula:

$$\alpha = \left[1 - \frac{a/b}{c/d}\right] \cdot \frac{b}{b-a}$$

where a is a quantity of the pass dies with defects, b is a quantity of total dies with defects, c is a quantity of the pass dies without defects, and d is a quantity of total die counts without defects.

3. The method as recited in claim 1, wherein the step of determining the yield impact contribution comprises:

initializing the yield impact contribution to zero;

modifying the yield impact contribution by the steps of:
weighting the hit ratio for each of the defect type with the defect counts of the defect type;
calculating a ratio of the weighted hit ratio of the defect type to a sum of the weighted hit ratio for the defect types, adding the ratio to a previous yield impact contribution, the previous yield impact contribution being obtained at a previous fail die; and
repeating the step of modifying until all dies have been considered; and calibrating the yield impact contribution by multiplying by the defect calibrated factor.

4. The method as recited in claim 3, wherein the step of determining the yield impact contribution is performed using formulae:

$$Kc_{ij} = Kc_{ij-1} + \frac{hr_i \cdot n_{ij}}{\sum_k (hr_k \cdot n_{kj})} \cdot \varphi_j \qquad \text{EQ. 1}$$

$$Kc_i = Kc_{ij} \cdot \alpha \qquad \text{EQ. 2}$$

where $Kc_i$ is the yield impact contribution of a specific defect i, j is die index, k is defect type index, α is the defect calibrated factor, $hr_k$ is the hit ratio for the defect type k, $n_{kj}$ is the defect counts of the defect type k on die j, and $\varphi_j$ is die impact factor of die j, said factor is assigned to 0 for the pass die and is assigned to 1 for the fail die.

5. The method as recited in claim 1, wherein the step of determining the yield impact contribution comprises:

determining the hit ratio for each of the defect types upon die-based defect-review-sampling method, wherein the die-based defect-review-sampling method restricts a single first found defect on each die; and determining the yield impact contribution for the defect type by calculating a ratio of the hit ratio weighted by a percentage of the defect counts out of the total defect counts to a sum of the hit ratio weighted by a percentage of the defect counts out of the total defect counts for each the defect type, and weight the ratio with a quantity of the fail dies.

6. The method as recited in claim 5, wherein the step of determining the yield impact contribution is performed using formulae:

$$Kc_i = K'c_i \cdot \alpha \qquad \text{EQ. 3}$$

$$K'c_i = \frac{hr_i \cdot \omega_i}{\sum_k (hr_k \cdot \omega_k)} \cdot n_f \qquad \text{EQ. 4}$$

where $Kc_i$ is the yield impact contribution of the defect type i, k is defect index, $n_f$ is the quantity of fail die count, $hr_k$ is the hit ratio of the defect k, and $\omega_k$ is the percentage of the quantity of the defect k out of all defect counts upon die-based defect-review-sampling, and $\alpha$ is the defect contribution calibrated factor.

7. The method as recited in claim 1, wherein the yield impact calibrated factor for each of the defect types is calculated using a formula:

$$\beta_i = \frac{f(D_{i0})}{D_{i0}A}$$

where i is defect type index, $D_{i0}$ is the average defect density of the defect type i, $f(D_{i0})$ is defect density distribution function of the defect type i, and A is a die area.

8. The method as recited in claim 1, wherein the kill ratio for each of the defect types is calculated using a formula:

$$Kr_{i0} = \frac{Kc_i}{(ND_{i0}A)\beta_i} \qquad \text{EQ. 5}$$

where $Kr_{i0}$ is an average of the kill ratio of the defect type i, $Kc_i$ is the yield impact contribution of the defect type i, N is total die counts, $D_{i0}$ is the average of defect density of the defect type i, A is the die area, and $\beta_i$ is the yield impact calibrated factor for the defect type i.

9. The method as recited in claim 1, wherein the step of determining the yield loss for each of the defect types based on the average kill ratio and a total of dies counts includes calculating the yield loss by dividing the kill ratio for a given defect inspection process by the total die counts of the semiconductor wafer, wherein said calculation is performed using the formula:

$$Y_i = Kr_{i0} \cdot [(D_{i0}A)\beta_i] \qquad \text{EQ. 6}$$

where $Kr_{i0}$ is the average kill ratio of defect type i, $D_{i0}$ is the average defect density of the defect type i, A is the die area, and $\beta_i$ is the yield impact contribution calibrated factor.

10. The method as recited in claim 1, wherein the yield loss for the defect type is expressed as a ratio of the yield impact contribution for the defect type to the total quantity of the die counts.

* * * * *